(12) United States Patent
Srikrishna et al.

(10) Patent No.: US 7,720,499 B2
(45) Date of Patent: May 18, 2010

(54) REGULATION OF TRANSMISSION POWER CONTROL IN MITIGATE SELF INTERFERENCE BY OPTIMIZING LINK TRANSMISSION PARAMETERS IN A WIRELESS NETWORK

(75) Inventors: Devabhaktuni Srikrishna, Sunnyvale, CA (US); Cyrus Behroozi, Sunnyvale, CA (US); Jay Kruse, Sunnyvale, CA (US); Rick Dean, Sunnyvale, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 996 days.

(21) Appl. No.: 11/363,121

(22) Filed: Feb. 27, 2006

(65) Prior Publication Data

US 2007/0201393 A1    Aug. 30, 2007

(51) Int. Cl.
*H04B 7/00* (2006.01)
*H04B 7/185* (2006.01)
(52) U.S. Cl. .................... 455/522; 370/318
(58) Field of Classification Search ............... 455/13.4, 455/522, 574, 127.1, 127.5
See application file for complete search history.

(56) References Cited

U.S. PATENT DOCUMENTS

| | | | |
|---|---|---|---|
| 5,257,283 A | 10/1993 | Gilhousen et al. | |
| 5,544,196 A | 8/1996 | Tiedemann, Jr. et al. | |
| 5,568,483 A | 10/1996 | Padovani et al. | |
| 5,590,408 A | 12/1996 | Weiland et al. | |
| 5,638,412 A | 6/1997 | Blakeney, II et al. | |
| 5,655,220 A | 8/1997 | Weiland et al. | |
| 5,732,328 A * | 3/1998 | Mitra et al. .................... | 455/69 |
| 5,778,338 A | 7/1998 | Jacobs et al. | |
| 6,480,497 B1 | 11/2002 | Flammer, III et al. | |
| 6,856,191 B2 | 2/2005 | Bartuni | |
| 6,934,387 B1 | 8/2005 | Kim | |
| 6,946,983 B2 | 9/2005 | Andersson et al. | |
| 2005/0020213 A1 | 1/2005 | Azman et al. | |
| 2005/0117559 A1 | 6/2005 | Malladi et al. | |
| 2005/0136844 A1 | 6/2005 | Giesberts et al. | |
| 2006/0029026 A1 | 2/2006 | Willenegger et al. | |
| 2006/0056356 A1 | 3/2006 | Arvelo | |
| 2006/0274764 A1 * | 12/2006 | Mah et al. .................... | 370/401 |

* cited by examiner

*Primary Examiner*—Nick Corsaro
*Assistant Examiner*—Joel Ajayi
(74) *Attorney, Agent, or Firm*—Brian R. Short

(57) ABSTRACT

A method of optimizing link transmission parameters between access nodes within a mesh network is disclosed. The method includes each access node within the mesh transmitting packets at N different combinations of data rates and power levels. Each receiving node that receives the data packets at one or more of the N combinations, selects a most desirable one of the received combinations. The receiving nodes indicate to the transmitting nodes the selected most desired combination for transmitting to the receiving node.

7 Claims, 7 Drawing Sheets

| Determined Data Traffic Type | Predetermined Characterization of Data Traffic |
|---|---|
| Routing Packet | Substanatially Periodic |
| 802.11 Broadcast Beacon | Substanatially Periodic |
| VOIP | Substanatially Periodic |
| Streaming Data (Video or Audio) | Substanatially Periodic |
| | |
| Other | Bursty |

FIGURE 4

| 11 Mbps/ 26dBm | 24 Mbps/ 26dBm | 48 Mbps/ 26dBm |
|---|---|---|
| 11 Mbps/ 30dBm | 24 Mbps/ 30dBm | 48 Mbps/ 30dBm |
| 11 Mbps/ 36dBm | 24 Mbps/ 36dBm | 48 Mbps/ 36dBm |

FIGURE 5

REGULATION OF TRANSMISSION POWER CONTROL IN MITIGATE SELF INTERFERENCE BY OPTIMIZING LINK TRANSMISSION PARAMETERS IN A WIRELESS NETWORK

FIELD OF THE INVENTION

The invention relates generally to wireless communications. More particularly, the invention relates to a method and apparatus for regulation of transmit power.

BACKGROUND OF THE INVENTION

Wireless networks, such as wireless mesh network, can include multiple transmitting devices simultaneously transmitting. The simultaneous transmission can cause interference between different devices of the network. For example, FIG. 1 shows transmitting devices 110, 120 and receiving devices 130, 140. Transmitting device 110 is attempting to transmit to the receiving device 130. The transmitting device 120 is attempting to transmit to the receiving device 140. However, as shown, some of the transmission signal of the transmitting device 110 interferes with the receiving device 140.

It is desirable to have a wireless network and a method of operating transmission of signals within the wireless network that mitigates self-interference within the network.

SUMMARY OF THE INVENTION

The invention includes a method and apparatus for regulation of transmission signal between access nodes of a mesh network.

An embodiment of the invention includes a method of regulating transmit power of a wireless device within a wireless network. The method includes determining a type of data traffic being transmitted, comparing the type of data traffic with a predetermined set of data traffic types that include substantially periodic transmission, and if the type of traffic being transmitted is one of the predetermined set, then adjusting the transmission power to a lower transmission power level than if the type of traffic being transmitted is not one of the predetermined set.

Another embodiment of the invention includes a method of regulating transmission power of a device within a wireless mesh network. The method includes identifying packets for transmission as either data packets or as routing packets, and setting the transmission power of transmit signals from the device to be lower for routing packets than for data packets.

Another embodiment of the invention includes a method of regulating transmission signal power for minimizing interference with unintended receivers. The method includes identifying data traffic as bursty or substantially periodic, and setting the transmission signal power lower for substantially periodic data traffic than for bursty traffic.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 4 is a table that list exemplary types of substantially periodic data traffic.

FIG. 5 is a table showing exemplary 802.11 transmission data rates and power levels.

DETAILED DESCRIPTION

The invention includes a method and apparatus for regulating transmission signal power based upon the type of data traffic being transmitted. Generally, data traffic that is characterized as substantially periodic tends to cause greater interference to unintended receivers than data traffic that is characterized as bursty. Therefore, within a wireless network, regulating transmission signal power so that the substantially periodic data traffic (such as, routing beacons, voice over IP, streaming data (video, audio ect.), 802.11 beacons) is transmitted at a lower power level than bursty data traffic (such as internet search information), reduces interference within a wireless network.

The term packet is used throughout this description. It is to be understood that the term packet can include 802.11 frames as defined by the 802.11 standard.

Figure 1:
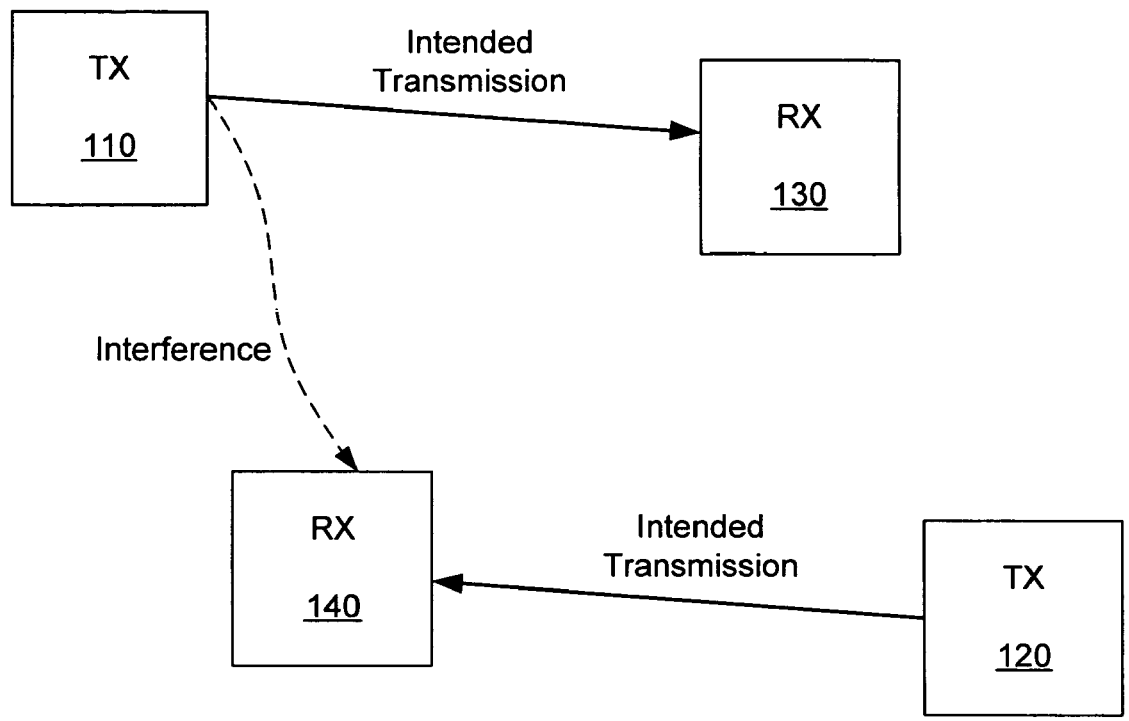
FIG. 1 shows a prior art set of wireless devices in which a receiving device suffers from interference.
Figure 2:
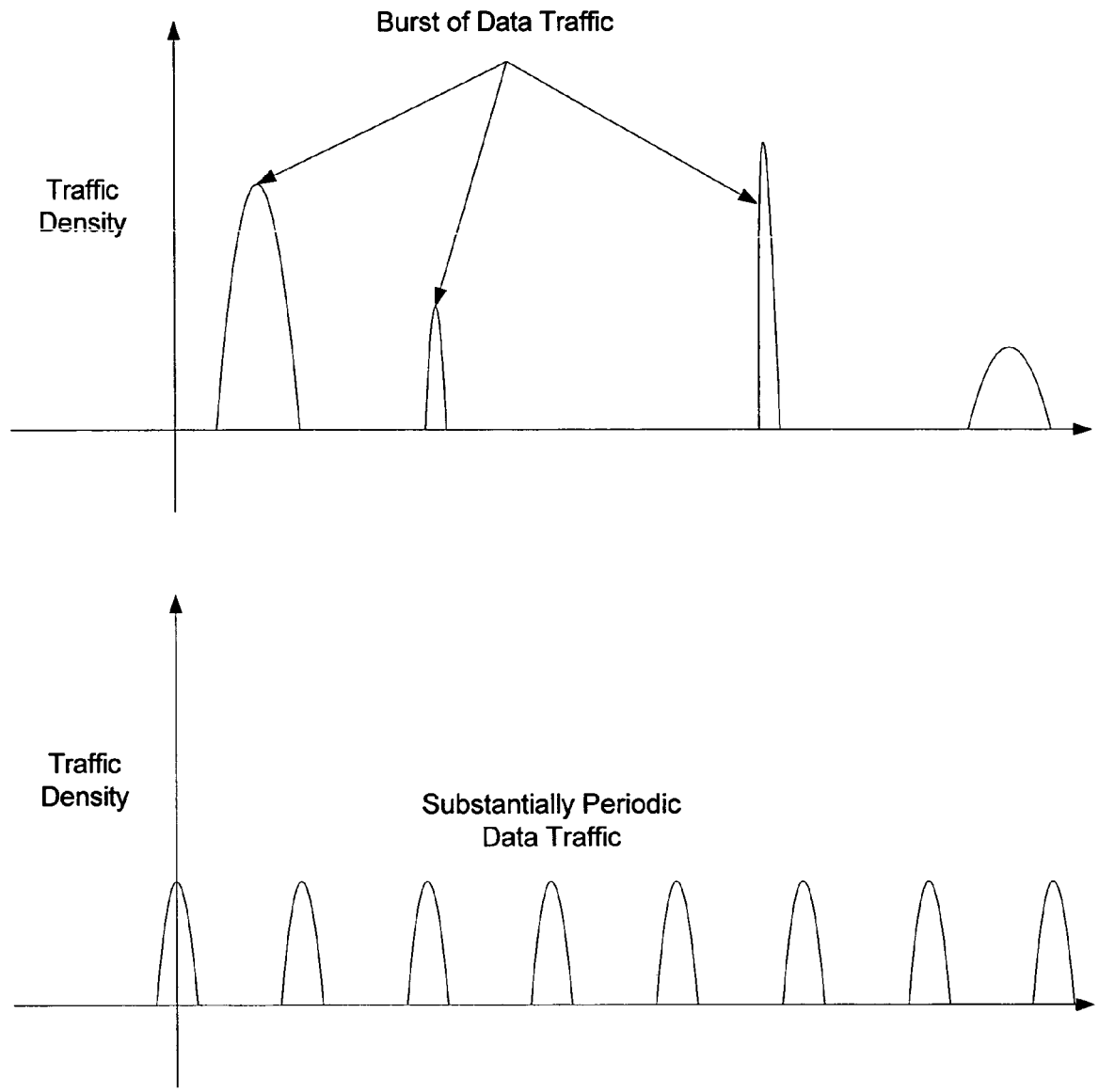
FIG. 2 shows time lines of various types of wireless data traffic, depicting bursty traffic and substantially periodic data traffic.

FIG. 2 shows time lines of various types of data traffic. A first time line 210 shows traffic density (number of packets per unit of time) for transmission data traffic that can be characterized as bursty. As shown, the bursty traffic can include time zones in which large amounts of data, is being transmitted. However, the transmission data traffic is intermittent. That is, the data traffic may be dense at times, but does not typically occur periodically. This type of data traffic can interfere with unintended receivers. However, the interference only occurs during a burst of data traffic. Bursty data traffic is typically, though not limited to, internet activity and email correspondence. These types of activities tend to occur in intermittent bursts rather than continuously substantially periodical sessions.

A second time line 220 shows traffic density for transmission data traffic that can be characterized as substantially periodic. This data traffic can be continuous for extremely long period (such as the transmission of routing packets as will be described, which may continue for months), or for shorter periods (such as voice over IP which may only last for several minutes). The overriding characteristic of this type of data traffic is that it is continuously, and at least substantially periodic for a relatively long period of time. This type of data transmission can be particularly problematic because it has a greater likelihood of causing interference with unintended receivers than bursty traffic. That is, the continuous periodic nature of this data transmission provides a higher probability that it will cause interference than the previously described bursty data traffic. The magnitude of the traffic density, or the time duration during each substantially periodic transmission is generally not as critical as is the fact that the data transmission is substantially periodic.

The data traffic designated as substantially periodic even if one or two of the points of traffic density are missed, or if they occur just off of being periodic. That is, the time line 220 could be missing some, or have some of the points of traffic density be off-center.

A distinction between substantially periodic traffic and bursty traffic is that the effects of substantially periodic traffic tend to be independent of packet length and payload. However, the effects of bursty traffic are dependent upon packet length and payload.

Figure 3:
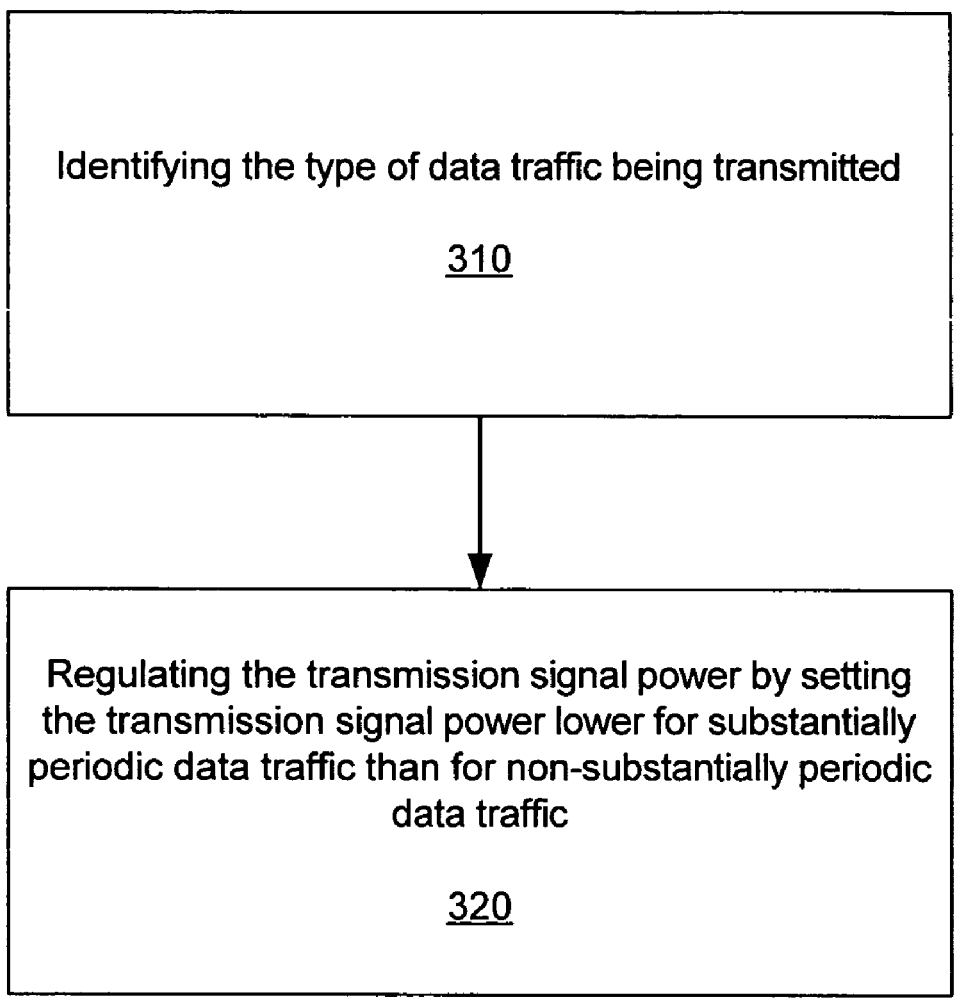
FIG. 3 is a flow chart showing a method of regulating transmission signal power to minimize interference with unintended receivers of a wireless network.

FIG. 3 is a flow chart that includes exemplary steps of a method of regulating transmission signal power to minimize interference with unintended receivers of a wireless network. A first step 310 includes identifying the type of data traffic being transmitted. A second step 320 includes regulating the transmission signal power by setting the transmission signal power lower for substantially periodic data traffic than for non-substantially periodic data traffic.

The transmission signal power is described as being decreased. However, an embodiment could include increasing the signal power for substantially periodic traffic.

Identifying the Type of Data Traffic

Several methods can be used to identify the type of data traffic. An access node within a wireless mesh network, for example, can have prior knowledge regarding the data traffic before transmission. Routing packets (also referred to as routing beacons) can be transmitted through the network to facilitate routing selections of the access nodes through the network. In at least some embodiments, the routing packets are transmitted at regular intervals. For example, one embodiment includes the routing packets being transmitted at a rate of four per second. Clearly, this type of routing packet can be classified as substantially periodic. As previously described, this type of data transmission is likely to cause unnecessary interference with unintended receivers. The access nodes have prior knowledge of when the routing packets are transmitted, and therefore, can identify this type of data traffic. Another type of data traffic that access nodes or transmitters in general can have prior knowledge of includes 802.11 beacons.

Another method of identifying the data traffic type includes inspecting data packets of the data traffic. This inspection can reveal, for example, whether the data traffic is voice over IP (VOIP) data traffic, streaming data (either video or audio) and should be designated as substantially periodic. The inspection of the data packets can also identify whether the data traffic in normal internet traffic (searching or email), and can be designated as bursty data traffic.

Once the traffic type has been identified, whether it can be categorized as substantially periodic can be determined by referencing a predetermined look up table. For example, FIG. 4 is a table showing different types of traffic, and the corresponding predetermined characterizations. As shown, routing packets, 802.11 broadcast packets, VOIP and streaming data can be pre-designated as substantially periodic traffic. As a default, other types of traffic can be designated as bursty, or just as not substantially periodic.

Regulating Transmission Signal Power Based on Traffic Type

After determining the type of data traffic, the access node or other type of transmitter regulates the transmission power level depending upon the type of data traffic. The regulation includes reducing the transmission power for substantially periodic data traffic to be lower than bursty traffic.

One embodiment includes the transmit signal power being reduced as low as possible while still ensuring a desired transmission data rate. A desired transmission data rate requires a minimum level of signal to noise ratio (SNR) at the receiving device. Therefore, the transmission signal power level can be reduced until the transmission signal power at the receiver satisfies the requisite level of SNR.

Setting the transmission power level, while satisfying the requisite level of SNR can be influence by many factors. For example, FCC (Federal Communication Commisssion) rules in the United States allow a 2.4 GHz transmitter to operate at any power level below 1 W (30 dBm). A set of power levels can be selected by a transmitter in a number of ways. In one embodiment, this selection is based on pre-set configuration parameters of the transmitter. In another embodiment, this selection is based on selecting the power levels based on the spacing or density of access nodes. For instance, with a high density of access nodes per square mile, the selected relevant power levels might comprise 20 dBm, 22 dBm, and 24 dBm. For a low density of access nodes per square mile, the relevant power levels might comprise 28 dBm and 30 dBm, since lower densities of access nodes require higher power levels to achieve the required SNR on each link.

One other embodiment includes incrementally reducing the transmission signal by by a predetermined amount (for example, 5 or 10 dB). Initially, the transmission power is set to a default value, and if the data traffic is determined to be substantially periodic, the default power level is attenuated accordingly.

There are tradeoffs to operating a link at different transmit power levels. A higher transmit power choice leads to better probability of successful packet reception at the other end of a link. On the other hand, operating at a higher power level typically results in increased interference across a larger area, resulting in a reduction in available network-wide airtime and overall network capacity. Similarly, there are tradeoffs to operating a link at different transmit data rates. Operating at a higher transmit rate (if the link supports it) can result in more efficient use of airtime, since it takes less time to transmit a bit. As a result, network capacity can be increased. On the other hand, higher data rates require a larger signal-to-noise ratio at the receiver for successful packet reception, and using a higher data rate may result in higher probability of packet loss, necessitating retransmissions.

FIG. 5 is a table showing exemplary permutations of communication link power levels and data rates. The transmission power levels can be adjusted according to the table. These combinations of power level and data rate correspond with the 802.11 wireless standards. Other power levels and data rates can also be used for communication links between access nodes of the mesh network. The general concept is that typically a finite number of power levels and data rates are available for the transmission links. Even if a continuum of power levels exists, a finite number of representative power levels can be selected from the continuum. Within a mesh network, the most desirable transmission power level and data rate can vary from one access node to another access node. Additionally, the most desirable power level and data rate can vary depending upon the direction of transmission, and can vary over time. The desired routing of data paths through the mesh network can be influenced by the power level and data rate selections of the links of neighboring access nodes within the mesh network.

Figure 6:
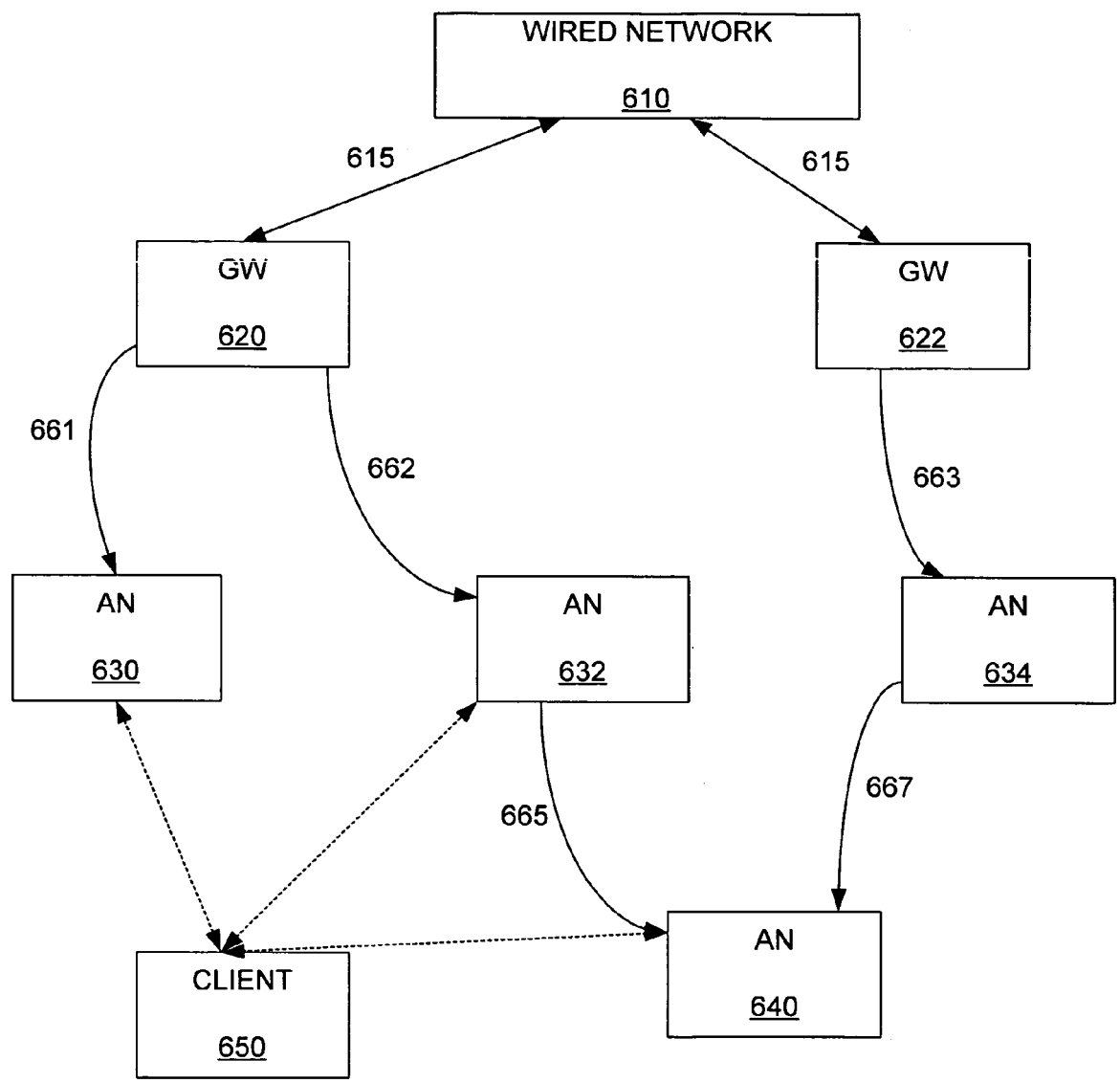
FIG. 6 shows a wireless mesh network that includes transmission of routing packets and data packet between access nodes of the wireless mesh network.

FIG. 6 shows a mesh network. Mesh networks can be particularly susceptible to the interference effects of substantially periodic traffic due to the fact that many transmitting devices and receiving devices can be relatively proximate to each other. Additionally, many of the devices can be simultaneously transmitting and receiving at the same time.

The wireless network includes gateways 620, 622 which are coupled to the wired network 610. The gateways 620, 622 typically include high bandwidth connections 615 to the wired network 610 which can be wired or wireless. A gateway is an access node that can originate routing beacons Access nodes 620, 622, 630, 632, 634, 640 are coupled either directly or indirectly to the gateways 620, 622. That is, each access node is either directly connected to an upstream gateway 620, 622, or indirectly connected through another access node to at least one of the upstream gateways 620, 622. Many factors can be included in the decision of which access nodes or gateways each access node is connected. The network of FIG. 6 can include any number of additional gateways and access nodes. As shown in FIG. 6, a client 650 can obtain access to the network by establishing a connection to an available access node, such as, any of access nodes 630, 632, 640.

Gateways 620, 622 broadcast routing packets (beacons), which can be used to determine routing between access nodes 630-640 and gateways 620, 622 of the network. The beacons are received by all first-level access nodes (for example, access nodes 630, 632, 634), which are access nodes that are able to receive gateway transmitted beacons, and directly route data through to a gateway. The beacons can be designated as substantially periodic, and therefore, have their transmission power level reduced to be less than the data packet transmission as has been described.

The beacons are used to establish a route from each access node to a gateway. The first level access nodes re-broadcast the beacon data, attaching their own information to the beacon. The information indicates to the second level access nodes that the path to the gateway includes the first level access node. The first level access nodes re-broadcast the beacons at all relevant power levels and data rates.

An upstream route can be selected based upon routing packet received from upstream gateways and access nodes. The select upstream link can be based upon the quality of the received routing packets, in which the received routing packets having the best quality are selected. The quality of received routing packets can be determined by a persistence of the received routing packets. The persistence can be determined by comparing a number of received routing packets per unit of time to a predetermined number of routing packets transmitted per unit of time. For example, if the access node (and gateway access nodes) broadcast routing packets (beacons) at a rate of four per second, and persistence can be determined by counting the number of received routing packets per second. If three packets are received, the persistence is 0.75. The access node can select an upstream access node as a routing path based upon the quality of the link between the access node and the upstream access node as determined by the quality (persistence) of the received routing packets.

For one embodiment, the link quality of the beacon received determines whether an upstream route is selected, and whether that beacon is rebroadcast by the system. If the quality of the beacon is the best of all beacons received from upstream access nodes and gateways, the corresponding upstream route is selected, and the beacon (routing packet) is rebroadcast. The beacons can be used to determine the quality of the link in both an upstream (towards a gateway) direction, and in a downstream (away from a gateway) direction. The upstream and the downstream link qualities can be used by each access node to select the best data routing path to a gateway. The link qualities of both the upstream links and the downstream links can be influenced by the pre-selected power levels of neighboring access nodes. The link qualities may also be influenced by other wireless transmission factors such as interference, noise and fading.

The first level access nodes 630, 632, 634 include upstream links, and downstream links to the gateways 620, 622. As shown in FIG. 6, access node 630 includes a downstream link 661 with the gateway 620, access node 632 includes a downstream link 662 with the gateway 620, and access node 634 includes a downstream link 663 with the gateway 622. The quality of a downstream link can be different than the quality of the corresponding upstream link.

FIG. 6 also includes a second level access node 640. As shown, the access node 640 can select a data path through access node 632 (through downlink 665), through access node 634 (through downlink 667), or through gateway 622 (through downlink 666). The access node 640 makes a data path routing selection based upon the best quality combination of the links (downstream and upstream, at selected power level and data rate) within the available data paths to a gateway. The upstream and downstream link qualities can be determined by a persistence of received routing beacons.

Each access node has at least one upstream node, and may have a plurality of downstream nodes. Upstream nodes are the nodes that are between the access node and the gateway. Upstream links are links in a path to a gateway. Downstream links are in a direction away from a gateway. For a level one access node, there is only one upstream node, the gateway. For a level four access node, there are four upstream nodes, which define the access node's path to the gateway. Downstream nodes are nodes that receive the beacon from a particular access node, and define their path to a gateway through that access node.

Figure 7A:
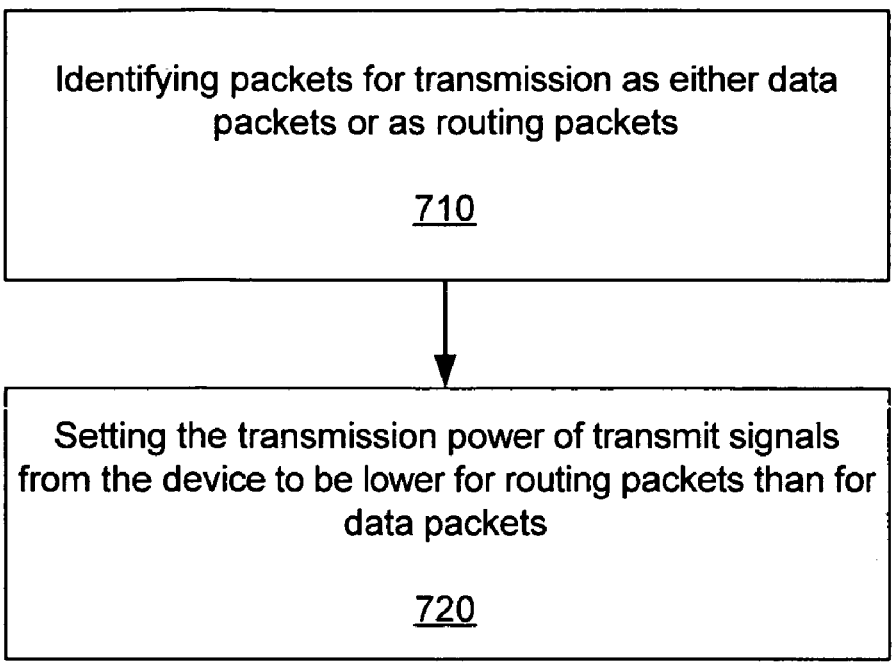
FIGS. 7A and 7B are flow chart showing other exemplary methods of regulating transmission signal power to minimize interference with unintended receivers of a wireless network.
Figure 7B:
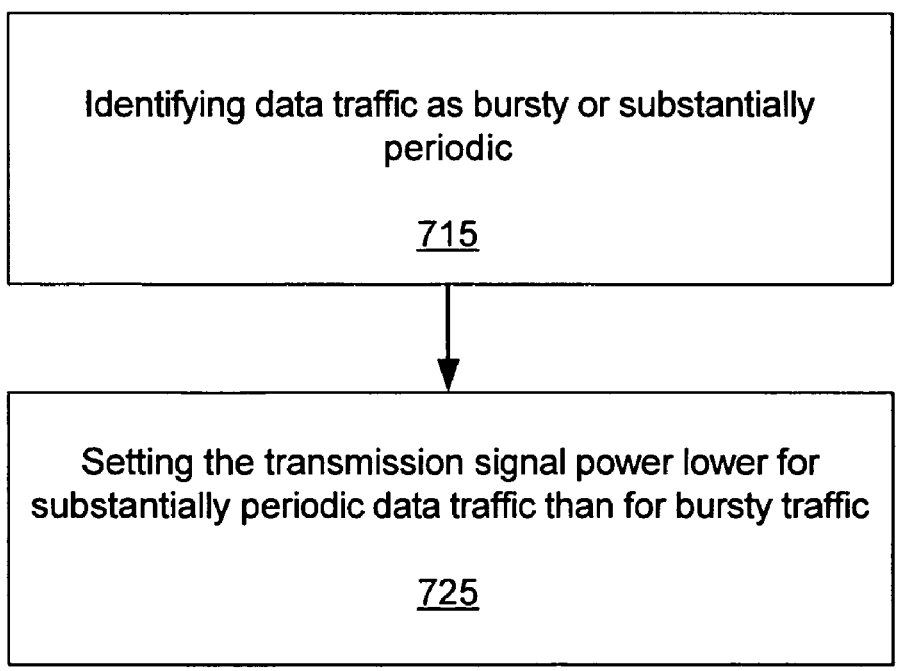

FIGS. 7A and 7B show other exemplary methods of regulating transmission signal power.

FIG. 7A shows a method of regulating transmission power of a device within a wireless mesh network. The mesh network can include at least one gateway access node, and a plurality of access nodes. A first step 710 includes identifying packets for transmission as either data packets or as routing packets. A second step 720 includes setting the transmission power of transmit signals from the device to be lower for routing packets than for data packets.

FIG. 7B shows a method of regulating transmission signal power for minimizing interference with unintended receivers. A first step 715 includes identifying data traffic as bursty or substantially periodic. A second step 725 includes setting the transmission signal power lower for substantially periodic data traffic than for bursty traffic.

Methods of identifying the packets and data traffic have been described. Additionally, methods of setting the transmission power have been described.

Although specific embodiments of the invention have been described and illustrated, the invention is not to be limited to the specific forms or arrangements of parts so described and illustrated. The invention is limited only by the appended claims.

What is claimed:

1. A method of regulating transmission power of access nodes within a wireless mesh network, the mesh network comprising at least one gateway access node, and a plurality of access nodes, the method comprising:

each access node identifying packets for transmission as either data packets or as routing packets;

each access node transmitting the routing packets periodically;

downstream access nodes selecting a routing path to at least one gateway based upon a quality of received routing packets;

each access node setting the transmission power of transmit signals from the device to be lower for routing packets than for data packets; wherein setting the transmission signal power lower for routing packets than for data packets comprises:

determining a minimum power level required to sustain a desired transmission rate for the routing packets, wherein the minimum power level is determined by measuring SNR at a receiver of the routing packets, and determining the minimum power level by comparing the measured SNR with an SNR required to maintain the desired transmission rate;

adjusting the transmission power level based on the minimum power level and a spacing density of the plurality of access nodes of the mesh network.

2. The method of claim 1, wherein routing packets are originated at the at least one gateway, and are modified and rebroadcast by receiving access nodes.

3. The method of claim 2, wherein the quality of received routing packets is determined by a persistence of the received routing packets.

4. The method of claim 3, wherein the persistence is determined by comparing a number of received routing packets per unit of time to a predetermined number of routing packets transmitted per unit of time.

5. The method of claim 1, further comprising the device initially having a default transmission power level.

6. The method of claim 5, wherein setting the transmission power to a lower transmission power level comprises attenuating the default transmission power level by a predetermined incremental amount.

7. The method of claim 1, wherein setting the transmission power to a lower transmission power level comprises:

determining a minimum power level required to sustain a desired transmission data rate;

adjusting the transmission power level to the minimum power level.

* * * * *

UNITED STATES PATENT AND TRADEMARK OFFICE
CERTIFICATE OF CORRECTION

PATENT NO. : 7,720,499 B2
APPLICATION NO. : 11/363121
DATED : May 18, 2010
INVENTOR(S) : Devabhaktuni Srikrishna et al.

It is certified that error appears in the above-identified patent and that said Letters Patent is hereby corrected as shown below:

On the Title Page, Item (54) and col. 1 lines 1-5, the correct title of the patent is "Regulation of Transmission Power within a Wireless Network".

Signed and Sealed this

Thirteenth Day of July, 2010

David J. Kappos
*Director of the United States Patent and Trademark Office*